(12) United States Patent
Mariotto et al.

(10) Patent No.: US 11,098,657 B2
(45) Date of Patent: Aug. 24, 2021

(54) METHOD AND A SYSTEM FOR STOPPING A GAS TURBINE, AND A VEHICLE

(71) Applicant: AIRBUS HELICOPTERS, Marignane (FR)

(72) Inventors: Damien Mariotto, Aix en Provence (FR); Stephane Cerqueira, Aix en Provence (FR)

(73) Assignee: AIRBUS HELICOPTERS, Marignane (FR)

( * ) Notice: Subject to any disclaimer, the term of this patent is extended or adjusted under 35 U.S.C. 154(b) by 21 days.

(21) Appl. No.: 16/695,872

(22) Filed: Nov. 26, 2019

(65) Prior Publication Data

US 2020/0173372 A1    Jun. 4, 2020

(30) Foreign Application Priority Data

Nov. 30, 2018  (FR) ...................................... 1872143

(51) Int. Cl.
*F02C 9/00*    (2006.01)

(52) U.S. Cl.
CPC ..................... *F02C 9/00* (2013.01)

(58) Field of Classification Search
CPC .... F02C 9/00; F02C 9/26; F02C 9/263; F02C 7/18; F02C 6/206; Y02T 50/60; F05D 2220/329; F01D 21/00; F01D 15/10
See application file for complete search history.

(56) References Cited

U.S. PATENT DOCUMENTS

| | | | | |
|---|---|---|---|---|
| 4,784,354 A * | 11/1988 | Tavano | .................. | B64D 37/26 244/135 B |
| 6,729,138 B2 | 5/2004 | Noussitou et al. | | |
| 9,140,225 B2 * | 9/2015 | Lollini | .................... | F02C 7/236 |
| 9,468,876 B2 * | 10/2016 | Bornes | .................. | B01D 29/56 |
| 9,963,995 B2 | 5/2018 | Doebbeling et al. | | |
| 2008/0173763 A1 * | 7/2008 | Morgia | .................. | B64D 37/26 244/135 R |
| 2010/0275608 A1 | 11/2010 | Snider et al. | | |

(Continued)

FOREIGN PATENT DOCUMENTS

| CA | 3 024 805 A1 | 6/2019 |
|---|---|---|
| CN | 1413289 A | 4/2003 |

(Continued)

OTHER PUBLICATIONS

Korean Notice of Preliminary Rejection dated Nov. 12, 2020 (with English Translation), Application No. 10-2019-0151614, Applicant Airbus Helicopters, 5 Pages.

(Continued)

*Primary Examiner* — Mussa A Shaawat
(74) *Attorney, Agent, or Firm* — Brooks Kushman P.C.

(57) ABSTRACT

A method and a system for stopping a gas turbine comprising a gas generator provided with rotary members and a combustion chamber. The gas turbine includes a fuel circuit controlled by calculation means in communication with a selector. The method includes a step of closing of the fuel circuit on order of the calculation means when the selector is positioned in a first position for causing the gas turbine to stop. If the gas turbine was not idling prior to the closure, or if it was idling, but for a length of time shorter than a threshold, then an electrical machine automatically rotates the rotary members for a limited duration.

20 Claims, 3 Drawing Sheets

(56) References Cited

U.S. PATENT DOCUMENTS

| | | | |
|---|---|---|---|
| 2011/0049891 A1 | 3/2011 | Bedrine et al. | |
| 2011/0139123 A1* | 6/2011 | Brocard | F02C 9/28 123/458 |
| 2013/0213044 A1* | 8/2013 | Lollini | B64D 37/14 60/734 |
| 2014/0298819 A1* | 10/2014 | Lindeman | F02C 7/22 60/776 |
| 2016/0311547 A1* | 10/2016 | Rossotto | F01D 21/00 |
| 2017/0009776 A1 | 1/2017 | Gomanne et al. | |
| 2017/0260872 A1 | 9/2017 | Munevar | |
| 2017/0301157 A1 | 10/2017 | Descubes et al. | |

FOREIGN PATENT DOCUMENTS

| | | |
|---|---|---|
| CN | 104169531 A | 11/2014 |
| CN | 106014650 A1 | 10/2016 |
| EP | 2644841 A1 | 10/2013 |
| EP | 3204618 A1 | 4/2016 |
| EP | 3075662 A1 | 10/2016 |
| FR | 3017413 A1 | 8/2015 |
| WO | 2009118298 A1 | 10/2009 |
| WO | 2016055738 A1 | 4/2016 |

OTHER PUBLICATIONS

French Search Report for French Application No. FR 1872143, Completed by the European Patent Office, dated Jul. 16, 2019, 9 pages.

Korean Office Action (with English Translation) dated Feb. 22, 2021, Application No. 10-2019-0151614, Applicant Airbus Helicopters, 10 Pages.

Chinese First Office Action & Search Report (with English Translation) dated Mar. 1, 2021, Application No. 201911205829.4, Applicant Airbus Helicopters, 19 Pages.

Canadian Office Action dated Jan. 25, 2021 (with English Machine Translation), Application No. 3,062,076, Applicant Airbus Helicopters, 11 Pages.

* cited by examiner

METHOD AND A SYSTEM FOR STOPPING A GAS TURBINE, AND A VEHICLE

CROSS-REFERENCE TO RELATED APPLICATIONS

This application claims priority to European patent application No. FR 1872143 filed on Nov. 30, 2018, the disclosure of which is incorporated in its entirety by reference herein.

BACKGROUND OF THE INVENTION

(1) Field of the Invention

The present invention relates to a method and to a system for stopping a gas turbine, in particular a gas turbine of a vehicle, and more particularly of an aircraft, or indeed for example of a rotary wing aircraft, and also for stopping at least one rotary system, if any, that is driven by the gas turbine.

(2) Description of Related Art

A vehicle, and in particular an aircraft, may be provided with a plurality of gas turbines. Certain rotorcraft are thus provided with one or more gas turbines for driving at least one rotary system, and in particular a rotor for providing lift, and possibly also propulsion in various directions.

Conventionally, a gas turbine comprises a gas generator provided with at least one compressor, a combustion chamber, and a high pressure expansion assembly connected to the compressor. The compressor may be provided with a plurality of compression stages, which may be axial and/or centrifugal. Likewise, the expansion assembly may comprise a plurality of expansion turbines. The gas turbine also includes at least one low pressure power turbine that may be free or linked to the gas generator, possibly via a freewheel. On an aircraft, the power turbine may drive at least one rotor for providing lift or indeed propulsion in various directions. The power created by the gas generator is transmitted to at least one power turbine, which in turn transmits the power to the lift or propulsion rotor.

The operation of the gas turbine is controlled by a control system. By way of example, a known full authority digital engine control system is referred to by the abbreviation FADEC. A control system usually comprises calculation means. Such calculation means may be referred to as an "engine electronic control unit" (EECU) or more simply as an "engine control unit" (ECU). Furthermore, the calculation means are connected to various sensors and to a fuel metering valve of the gas turbine. The calculation means then control the fuel metering valve in order to control the rate at which fuel is delivered to the gas turbine.

The control system is conventionally connected to a selector, which is referred to as the "control" selector, for convenience. For example, the control selector may have three positions.

When the control selector is in a first position, e.g. referred to as its "STOP" position, the calculation means close the fuel valve. The gas generator is then stopped, which leads to the power turbine stopping and thus to the associated rotor(s) stopping.

When the control selector is in a second position, e.g. referred to as its "FLIGHT" position, the gas turbine is in operation. The term "nominal" operation as used below relates to the operation of the gas turbine while the control selector is in the FLIGHT position. The gas turbine, together with the rotor(s), can then operate in application of a plurality of distinct operating ratings.

Finally, the control selector has a third position, e.g. referred to as its "IDLE" position. When the control selector is placed in this IDLE position, the gas turbine, together with the rotor(s), operates at an idling speed, with the fuel metering valve continuing to deliver fuel to the gas turbine, but at a reduced flow rate.

In order to stop a gas turbine in nominal operation, a person may apply a first procedure of switching the control selector from its "FLIGHT" position to its "STOP" position.

When the control selector is switched to its STOP position, the control system closes the fuel valve to cut off the supply of fuel to the gas turbine. The gas generator then stops quickly, allowing the power turbine together with the rotor(s) to decelerate likewise. In the presence of a power turbine that is free or linked via a freewheel, this deceleration takes place more quickly as a result of opposing powers that are associated with the mainly mechanical and aerodynamic losses of the mechanical assembly linked to the power turbine.

In the long run, stopping the gas turbine directly by switching the control selector from the FLIGHT position to the STOP position can lead to a phenomenon of the fuel and/or of the lubricating oil coking. For example, oil is used to lubricate bearings located in zones of the gas generator that are very hot while the engine is in a nominal mode of operation. The coking phenomenon can tend to solidify a portion of this oil when the gas turbine is stopped suddenly, with the engine thus still being hot. Such solidified oil can plug lubrication nozzles. Furthermore, while the gas turbine is still hot, the gas turbine may suffer damage if it is restarted without taking special precautions.

To avoid this phenomenon of coking and/or to avoid damage in the event of restarting, an engine manufacturer may require a particular mode of operation to be followed in order to stabilize the gas turbine thermally before stopping it completely. In a second procedure, this mode of operation requires the control selector initially to be switched to the IDLE position in order to keep the gas turbine idling while continuing to be fed with fuel, but at a reduced rate for a certain duration, possibly as specified in the flight manual, prior to switching the control selector to its STOP position. Idling seeks to stabilize the gas turbine at low temperature prior to shutting down the gas turbine completely in order at least to limit the risk of coking or indeed to avoid difficulties on restarting. The idling stage enables the rotary members of the gas turbine to continue to be rotated by injecting some minimum quantity of fuel into the gas generator. Idling serves in particular to discharge the hot gas present in the gas turbine and to cool the gas turbine.

This mode of operation is effective, but it increases the workload on a pilot and/or it requires a waiting time in the IDLE position of the order of one or several minutes, with to the rotor(s) that are driven by the power turbine also being kept in rotation. Furthermore, on a multi-engine aircraft, this mode of operation needs to be applied to each gas turbine. Under certain emergency conditions, in order to benefit from a saving in time while stopping the gas turbine and indeed said rotor(s), a pilot must then choose between not applying this procedure, thereby accepting a degree of degradation of the gas turbine.

Document EP 3 204 618 describes a step of temperature stabilization during which the gas turbine operates at idling speed before being stopped completely, the duration of the temperature stabilization step being adapted in the basis of a temperature behavior model.

Document FR 3 017 413 does not belong to the field of invention, since it relates to a lubrication device. Likewise, documents relating to automobile turbochargers do not in fact belong to the field of the invention.

Document EP 3 075 662 describes calculation means in communication with a selector that is configured to generate an order for stopping a gas turbine and an order for operating the gas turbine.

BRIEF SUMMARY OF THE INVENTION

An object of the present invention is thus to propose a novel automatic method for stopping a gas turbine, possibly together with one or more rotors driven by the gas turbine, and to do so while limiting the risk of oil coking.

The invention thus seeks to provide a method of stopping at least one gas turbine, said at least one gas turbine comprising a gas generator provided with rotary members and a combustion chamber, said at least one gas turbine comprising at least one power turbine, said at least one gas turbine comprising a fuel circuit controlled by calculation means, said calculation means being in communication with a selector.

The selector may be operated by a pilot in order to generate a stop order for stopping the gas turbine. Furthermore, the selector may be operated by a pilot to generate at least one operation order for operating the gas turbine, and for example a nominal operation order for nominal operation of the gas turbine, and an idling operation order for idling operation of the gas turbine. The selector may be provided in various forms, and by way of example it may be in the form of a member that is movable between various positions, or a plurality of members that can be operated by a pilot, or a touch sensitive member, or a member that is controlled by voice or by eye.

The method comprises the following steps for stopping said at least one gas turbine while it is in operation and being fed with fuel by the fuel circuit:

generating a stop order with the selector for stopping the at least one gas turbine;

following said generation of the stop order, closing the fuel circuit on order of the calculation means; and following said generation of the stop order, and if said at least one gas turbine was not idling prior to said stop order, or if said at least one gas turbine was in idling operation at the time of said generation of the stop order for a length of time shorter than a stored threshold, automatically making use of an electrical machine to rotate said rotary members of the gas generator for a limited duration.

For example, the threshold may be stored in the calculation means of the at least one gas turbine, or in the electrical machine, or indeed in an external controller.

By way of example, the term "closing the fuel circuit" means that the calculation means cut off the feed of fuel to the combustion chamber of the engine by transmitting a stop signal to a member of the fuel circuit. Thus, the calculation means can transmit a stop signal, e.g. in order to close a fuel metering valve, in order to cut off a pump, and/or in order to close other valve means of the fuel circuit.

The term "automatically" means that the electrical machine is also activated to drive rotation of the rotary members without human intervention when the specified conditions are satisfied.

Under such circumstances, while the gas turbine is being fed with fuel, the selector is operated by an operator in order to generate the stop order for the purpose of shutting down the gas turbine. The calculation means receive the stop order and control of the fuel circuit to cut off the feed of fuel to the combustion chamber.

If the stop order is given without passing through a stage of idling, or after passing through a stage of idling, but for a length of time shorter than a threshold, then the electrical machine causes the rotary members of the gas generator to rotate for a duration, referred to for convenience as a "limited" duration, since the value of this duration is finite, even if it may optionally be variable. The electrical machine drives rotation of the rotary members of the gas generator at a ventilation speed. The ventilation speed may be low, but it enables gas to be caused to flow inside the gas turbine, and in particular it serves to discharge the hot gas that is present in the gas turbine at the time the feed of fuel is cut off. During this ventilation, and in the absence of fuel being injected into the combustion chamber, the speed of rotation of the power turbine decreases. In particular, in the presence of a power turbine that is free or that is linked via a freewheel, the speed of rotation of the power turbine rapidly drops to zero, i.e. following a speed gradient that depends at least on opposing powers associated with the mainly mechanical and aerodynamic losses of the mechanical assembly that is coupled to the power turbine and that includes the rotor(s).

For an aircraft having at least one rotor driven by the power turbine, the gas turbine can be ventilated while the rotor is stationary.

Furthermore, bringing the power turbine and the rotor to rest quickly can also improve the noise comfort of passengers and reduce any risk of accident as a result of a person coming into contact with a rotating rotor.

This method thus enables a gas turbine to be ventilated automatically. This makes it possible to comply with the requirements of the flight manual of an aircraft by ventilating the gas turbine so as to guarantee the integrity of the gas turbine, while limiting any risk of oil coking and potentially any risk of damage or difficulty in restarting.

Furthermore, automating a method can make it possible to achieve a significant saving of time when performing missions and/or to achieve a reduction in the workload on a pilot of an aircraft when stopping the gas turbine.

When the stop order is generated directly without passing through a stage of idling, the ventilation necessary for cooling the gas turbine in order to limit any risk of coking is not provided by a stage of idling operation with some minimum amount of fuel being injected into the combustion chamber, but rather by using an electrical machine to drive the rotary members of the gas generator.

When the stop order is generated indirectly, i.e. after passing through a stage of idling operation, the ventilation necessary for cooling the gas turbine in order to limit any risk of coking is provided by the stage of idling operation, and under certain circumstances, is also provided subsequently by the rotary members of the gas generator being driven by an electrical machine.

Such a method may thus tend to optimize fuel consumption firstly by not requiring a lengthy idling stage in which fuel is consumed and secondly by causing the rotary members to rotate by using an electrical machine that consumes only electrical energy that has been stored in advance by energy storage systems.

This method may also include one or more of the following characteristics.

In one aspect, the method may include a step of using a brake to brake said at least one power turbine.

Optionally, the brake may be arranged to act directly or indirectly to brake at least one power turbine even more quickly, in particular for a power turbine that is free or that is linked via a freewheel. By way of example, this step of braking the power turbine with a brake may take place automatically either from the time at which the selector generates the stop order for stopping the gas turbine, or else following closure of the fuel circuit.

In one aspect, prior to said closure, said method may include the following steps:

operating the selector by a pilot to generate the stop order, the selector transmitting to the calculation means a selection signal specifying said stop order; and transmitting a cut off order by the calculator means to the fuel circuit following reception of said selection signal, said fuel circuit closing on receiving said cut off order.

In one aspect, said closure of the fuel circuit may be achieved by operating the selector so that it passes directly from generating a nominal operation order to generating a stop order without passing through generating an idling operation order.

Specifically, the electrical machine is then used to limit any risk of coking. This procedure makes it possible to obtain a significant saving in time when performing missions, and/or to reduce the workload on a pilot of an aircraft.

In one aspect, the limited duration may be equal to a maximum duration stored in the system, and for example in the calculation means or in the electrical machine. By way of example, the maximum duration may be equal to one minute; however it might have other values, e.g. depending on the thermal and aerodynamic model of the gas turbine. By way of example, this duration of one minute may be increased to two minutes in order to be certain of removing all of the excess heat (hot gas, hot oil, hot walls of the gas turbine).

In another example, the limited duration may be variable and settable automatically in use, e.g. as a function of at least one parameter. In variants, the limited duration may be established in use by means of a model of the operation of the gas turbine and/or by means of parameters that are measured in real time. By way of illustration, a stored mathematical relationship may provide the limited duration that is to be applied as a function of a temperature of the gas turbine, and/or of an outside temperature, and/or of a length of time of any idling operation of the gas turbine.

In one aspect, the selector may be configured to be capable of generating an idling operation order for the at least one gas turbine, and a pilot may use the selector to engage idling operation prior to stopping the gas turbine. The method may then comprise the following steps:

detecting that the at least one gas turbine is idling at the moment said stop order is generated;

when said at least one gas turbine was idling at the moment said stop order was generated, determining (e.g. by using the calculation means) said length of time in an idling operation of the at least one gas turbine before said stop order was generated;

optionally comparing said length of time with the stored threshold; and when said length of time is shorter than the threshold, automatically making use of the electrical machine to rotate said rotary members of the gas generator for said limited duration.

This method may also be applied in the event of the gas turbine being stopped directly, in which case said length of time that is compared with the threshold is considered to be zero.

Under such circumstances, following closure of the fuel circuit, the electrical machine is switched on automatically to drive the rotary members of the gas generator, either because the gas turbine was not idling at the time of closure, or else because the gas turbine had been idling at the time of closure, but for a length of time shorter than a threshold. Thus, the method makes it possible to guarantee complete ventilation of the gas turbine.

In the presence of an idling stage, the limited duration may vary, in particular as a function of the length of time in idling operation of the gas turbine prior to the stop order being generated.

For example, the limited duration may be equal to the difference between the stored threshold and said length of time. Like the above-mentioned maximum duration, this stored threshold may be constant or it may be settable in use.

By way of illustration, the stored threshold may be equal to one minute. If the gas turbine has been idling for twenty seconds when the selector is operated to generate the stop order, then the electrical machine drives the gas generator for a limited duration equal to one minute minus twenty seconds, i.e. forty seconds.

In one aspect, the ventilation speed may lie in the range 8% to 15% of a stored nominal speed for the gas generator.

Optionally, the ventilation speed may be settable automatically in use, e.g. as a function of surrounding conditions. In an example, the ventilation speed may be equal to 8% of the stored nominal speed for an outside temperature higher than 15° C. and it may be equal to 15% of the stored nominal speed for an outside temperature less than or equal to 15° C.

Optionally, the ventilation speed is either constant, or else decreasing, or else constant and then decreasing.

The ventilation speed may be constant, or it may follow a profile that is adapted to optimize the lifetime of the gas turbine, to reduce the length of ventilation time, and/or to optimize fuel consumption. The above profiles are given by way of illustration.

For example, the ventilation speed may be equal to a first value for a first duration after which it decreases slowly down to a minimum speed prior to stopping completely.

In one aspect, the electrical machine automatically rotates said rotary members of the gas generator for a limited duration under the control either of a signal transmitted by said selector to the electrical machine, or of a signal transmitted by said calculation means to the electrical machine, or of a signal transmitted by an external controller that is in communication at least with said selector or with the calculation means.

In a variant, an electrical machine may be controlled by its own control electronics to apply the method as a function of at least one relationship stored in the control electronics and as a function of signals coming from the selector, and/or from the calculation means, and/or from an external controller.

In one aspect, the step of automatically making use of an electrical machine to rotate the rotary members for a limited duration comprises a step of controlling the speed of the electrical machine as a function of a speed that is estimated using at least one sensor of the electrical machine or of the at least one gas turbine. By way of example, such a sensor may be a speed sensor or a position sensor.

In one aspect, the step of automatically making use of an electrical machine to rotate the rotary members for a limited duration comprises a step of controlling the torque of the electrical machine as a function of a torque estimated from a measurement of the electric current consumed by the electrical machine The electricity consumed may be measured with a conventional electric current sensor.

In one aspect, said at least one gas turbine may comprise a plurality of gas turbines, each connected to a respective electrical machine, and the method may include the following step: a common controller controlling each electrical machine in motor mode, said controller activating the electrical machines one after another while stopping the gas turbines, with none of the electrical machines being capable of operating in an electricity generator mode during said stopping.

In addition to a method, the invention provides a system applying the method. Such a system is provided with at least one gas turbine, said gas turbine comprising a gas generator provided with rotary members and with a combustion chamber, said gas turbine comprising at least one power turbine, said gas turbine comprising a fuel circuit controlled by calculation means, said calculation means being in communication with a selector, said selector being configured to generate a stop order for stopping the at least one gas turbine and for generating at least one operation order for operating the at least one gas turbine.

Furthermore, said system includes a respective electrical machine for each gas turbine, said electrical machine being connected to the gas generator of the corresponding gas turbine and being configured to apply the method of the invention.

In one aspect, the system may include at least one brake for braking said power turbine.

The invention also provides a vehicle provided with such a system.

The vehicle may include at least one rotor that is driven in rotation by said power turbine.

BRIEF DESCRIPTION OF THE DRAWINGS

The invention and its advantages appear in greater detail in the context of the following description of embodiments given by way of illustration and with reference to the accompanying figures, in which.

DETAILED DESCRIPTION OF THE INVENTION

Elements that appear in more than one of the figures are given the same references in each of them.

Figure 1:
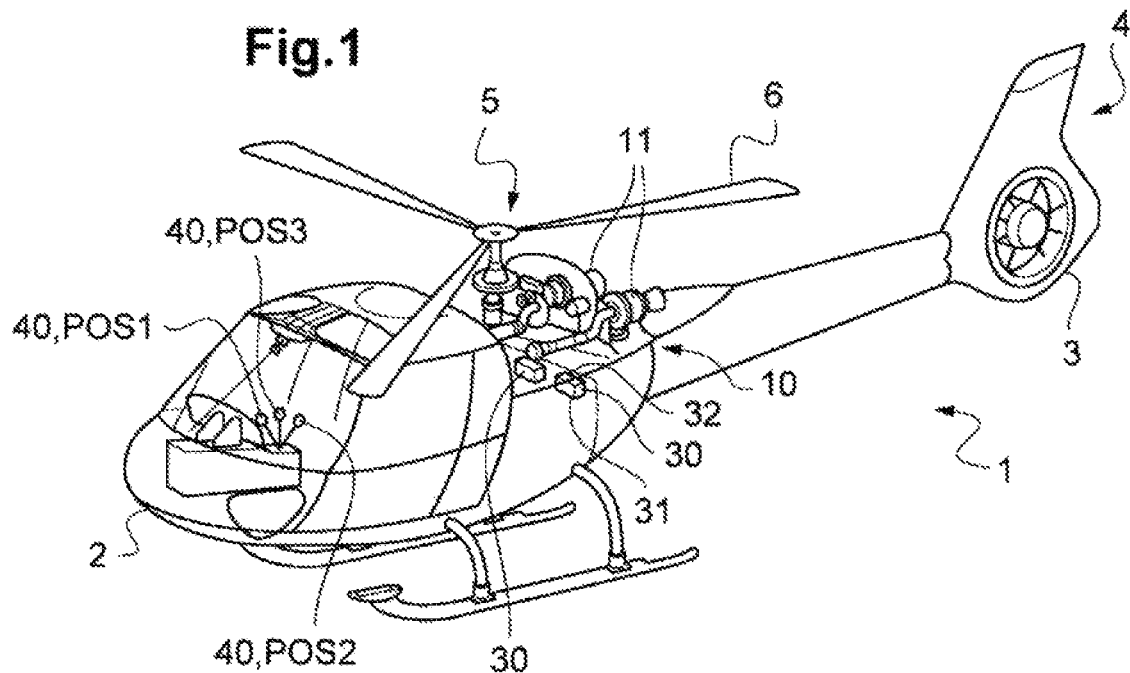
FIG. 1 is a view of a vehicle of the invention.

FIG. 1 shows a gas turbine 11 and a system enabling the gas turbine are to be stopped by applying the method of the invention. The gas turbine is arranged on a vehicle. The invention is applicable to any type of vehicle. Furthermore, the method is also applicable to stopping gas turbines that are not located on a vehicle.

In order to illustrate the invention, FIG. 1 shows an embodiment relating to a vehicle 1 of the aircraft type that has at least one gas turbine.

The aircraft has a structure extending longitudinally from a front end 2 to a rear end 3. Furthermore, the aircraft is a rotorcraft having a main rotor 5 provided with blades 6 for providing the aircraft with at least part of its lift and possibly also of its propulsion. The aircraft 1 also has a yaw movement control rotor 4 for controlling the yaw movement of the aircraft.

In the embodiment of FIG. 1, in order to drive the various rotors, the aircraft includes a power plant 10. The power plant 10 is provided with a plurality of gas turbines 11. By way of example, each gas turbine drives the main rotor 5 through a main power transmission gearbox referred to as the MGB.

Each gas turbine is controlled by calculation means 30. The term "calculation means" is used to cover single calculation means or a set of calculation means. Also, and by way of example, the calculation means may comprise at least one processor 31 with at least one memory 32, at least one integrated circuit, at least one programmable system, at least one logic circuit, these examples not limiting the scope to be given to the term "calculation means". Such calculation means may comprise an ECU.

For example, each gas turbine is controlled by its own calculation means 30.

Figure 2:
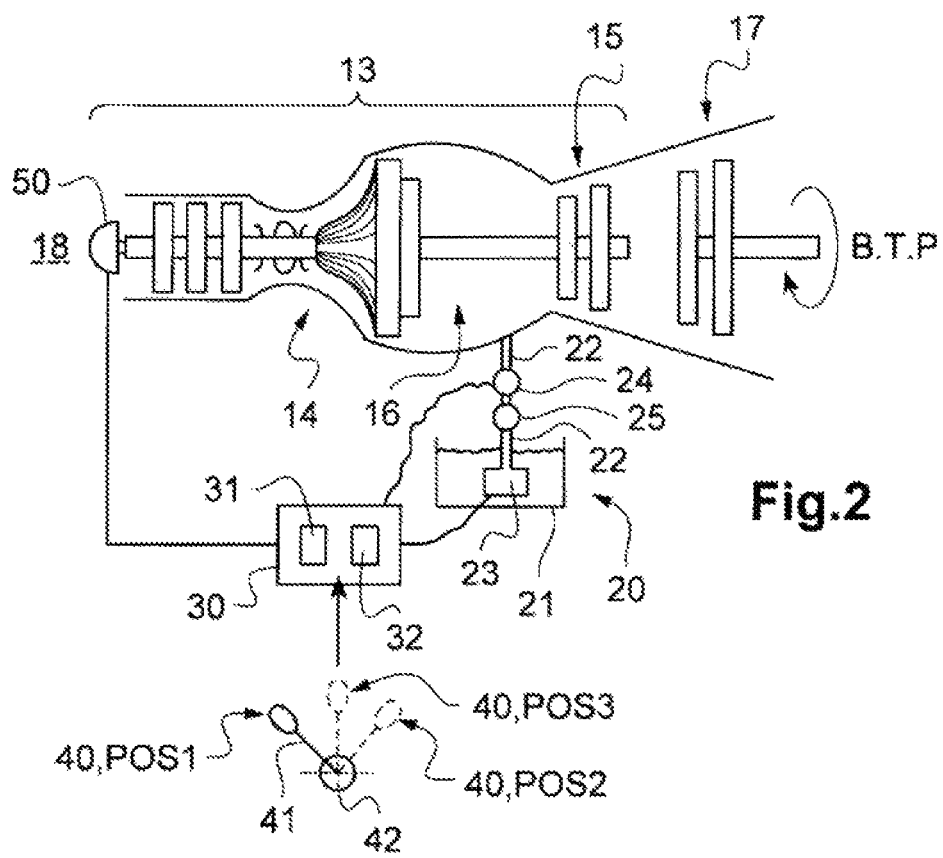
FIG. 2 is a diagrammatic view of a gas turbine.

With reference to FIG. 2, and independently of whether or not it is installed within a vehicle, a gas turbine usually has an air inlet 18 for feeding a gas generator 13 with air. The gas generator 13 includes a compressor 14 provided with one or more compression turbines in order to compress the air coming from the air inlet 18.

The compressed air is then taken to a combustion chamber 14 of the gas generator 13. The combustion chamber is fed with fuel by a fuel circuit 20. For example, the fuel circuit includes at least one fuel tank 21, and/or at least one pipe 22, and/or at least one suction pump and/or backing pump 23, and/or a fuel metering valve 24, and/or a fuel shut-off valve 25. In addition, the calculation means 30 can close the fuel circuit, i.e. can cut off the supply of fuel to the combustion chamber by sending a stop signal for that purpose to said at least one pump, and/or to the fuel metering valve and/or to the shut-off valve, and/or to any member in the fuel circuit that is suitable for isolating the combustion chamber 16 from fluid flow from the fuel tank 21. Such a stop signal may be in the form of a signal that is electrical, analog, or digital.

The hot gas leaving the combustion chamber 16 expands, thereby driving rotation of an expansion assembly 15 provided with at least one high pressure turbine. Each high pressure turbine is constrained to rotate with the compressor 14.

Under such circumstances, the compressor 14 and the expansion assembly 15 form rotary members of the gas generator 13. The compressor 14 and expansion assembly 15 are caused to rotate at a speed of rotation Ng.

Furthermore, the gas turbine 11 includes at least one power turbine 17 downstream from the gas generator, and specifically two power turbines in the example shown. The power turbine then serves to drive the outlet shaft of the gas turbine 11. For example, such an outlet shaft may serve to drive a power transmission gearbox MGB. The power turbine may be a turbine that is linked via a freewheel to the gas generator, or it may be a free turbine.

The installation also includes a motor machine that is mechanically connected to the rotary members of the gas generator 13. For example, the motor machine is connected to a shaft that is physically constrained to rotate with each of the turbines of the gas generator. Optionally, the motor machine may be an electrical machine 50, for example a conventional electrical machine, sometimes referred to as a "starter-generator", that is suitable for operating alternatively in a motor mode and in an electricity generator mode.

The electrical machine may also comprise no more than an electric motor with its associated control electronics. The electrical machine 50 may be connected by wired or wireless connections to at least one calculation means 30 in order to be capable of receiving control signals issued by the calculation means 30.

In the presence of a plurality of gas turbines, a single electrical machine may optionally be connected to all of the gas turbines.

In the presence of a plurality of gas turbines, the system may include one electrical machine for each gas turbine, with it being nevertheless possible for the electrical machines to share some members in common. For example, each electrical machine may include power and control electronics for the motor mode and power and control electronics for the electricity generator mode in a single unit.

In the presence of a plurality of electrical machines, a single common controller may form power and control electronics for the motor mode in all of the electrical machines.

Specifically, since the gas turbines are started one after another, the power and control electronics for the motor mode of the electrical machines may be combined within a common controller in order to reduce the overall weight of the complete system. Optionally, during a stage of stopping the gas turbines in the context of the present invention, the electrical machines may be controlled automatically by the common controller so as to be active one after another. Each electrical machine may optionally be controlled in application of a stepped control function that takes account of the potential slow deceleration of the previously activated electrical machine. Optionally, during a stage of stopping the gas turbines, the electrical machines are prevented from operating in electricity generator mode.

In another aspect, the calculation means 30 may be connected to a measurement system assembly by wired or wireless connections. The measurement assembly may include various sensors, where the term "sensor" should be understood broadly as referring either to a sensor as such, or else to a system that serves to determine the value of a parameter. The measurement assembly 50 may include sensors for determining the value of at least one engine parameter of a gas turbine, e.g. such as a temperature of the gas turbine such as a temperature downstream from the gas generator, a torque developed by the gas turbine, the speed of rotation of the gas generator of the gas turbine, the speed of rotation of the power turbine.

In one aspect, the installation may include a selector 40 that can be operated to cause at least one gas turbine to be put into operation or to be stopped. For example, the installation may have one selector 40 for each gas turbine. Each calculation means 30 may be connected to one or more selectors 40 by wired or wireless connections. The electrical machine 50 may be connected by wired or wireless connections to a selector 40.

Such a selector 40 may comprise a sensor 42 together with a member 41 that is capable of occupying a variety of positions POS1, POS2, POS3 in order to generate a variety of orders ORD1, ORD2, ORD3. The sensor 42 transmits a signal to the calculation means 30, which signal varies as a function of the position occupied, and it is referred to, for convenience, as the "selection" signal. In particular, the selector may be positioned at least in a first position POS1, drawn in continuous lines, for the purpose of transmitting a selection signal informing the calculation means that the gas turbine is to be shut down completely. The selector may be positioned in other positions, and for example in a second position POS2, drawn in dashed lines, for the purpose of transmitting a selection signal informing the calculation means that the gas turbine is to operate normally. The selector may be positioned in an intermediate, third position in order to transmit a selection signal informing the calculation means that the gas turbine is to idle.

The selector may take on other forms for the purpose of selecting the three above-mentioned modes of operation. For example, the selector may comprise a touch, voice, or eye-controlled selection system.

Figure 3:
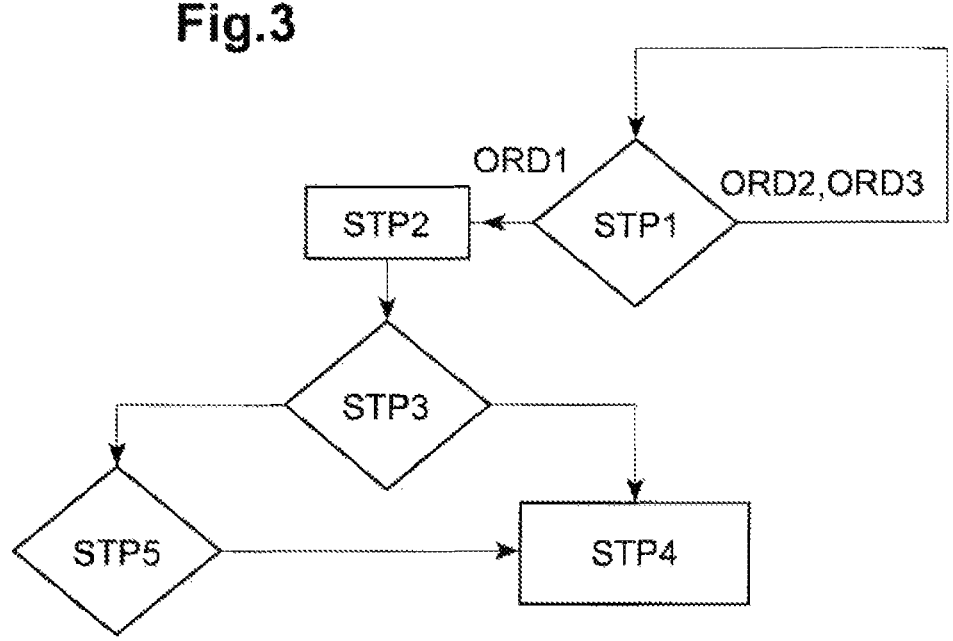
FIG. 3 is a flowchart showing the method of the invention.

The installation is suitable for applying the method of the invention as shown in FIG. 3.

In this method, during a monitoring step STP1, the calculation means 30 can determine which order is given by the selector 40. For example, the calculation means 30 analyze the selection signal coming from the selector 40 so as to determine whether the selection signal conveys a stop order ORD1 for stopping the gas turbine or an order for operating the gas turbine, and more precisely a nominal operation order ORD2 or an idling operation order ORD3 for the gas turbine.

When the selector 40 generates a stop order ORD1, the calculation means 30 operate at least one element of the fuel circuit 20 so as to close the fuel circuit during a close step STP2.

In parallel, before closure of the fuel circuit or following the step of closing the fuel circuit, during an evaluation step STP3, the system determines whether the electrical machine needs to be used in order to ventilate the gas turbine.

In particular, the system may determine whether the gas turbine was idling before the closure order was given. For example, the calculation means 30 or the power and control electronics for the motor mode of the electrical machine, or indeed an external controller, can analyze the signal issued by the selector 40 to determine whether the selector 40 was generating a nominal operation order ORD2 or an idling operation order ORD3 prior to generating the stop order ORD1.

If the gas turbine 11 was not idling prior to closing the fuel circuit, then a forced ventilation step STP4 is initiated. The calculation means 30 or the power and control electronics for the motor mode of the electrical machine, or indeed an external controller, can control the electrical machine 52 cause it to operate in motor mode. The electrical machine 50 is caused to move automatically in order to enable the rotary members 14, 15 of the gas generator to rotate at a ventilation speed for a limited duration Tvent. Under such circumstances, this limited duration Tvent may be equal to a stored maximum duration Tmax, which maximum duration Tmax may be constant, and for example about one minute, or else it may be settable in use as a function of one or more parameters.

During the forced ventilation step STP4, the rotary movement of the rotary members 14, 15 enables the gas turbine to be ventilated in spite of its fuel being cut off.

Also, the ventilation speed may be optimized, being controllable and settable as a function of the thermal and aerodynamic model of the gas turbine and/or of parameters that are measured in real time.

In one possibility, the ventilation speed may lie at most in the range 8% to 15% of a nominal speed defined for the gas generator.

Also, the power turbine may optionally be braked by a brake.

At the end of the limited duration Tvent, the electrical machine is stopped.

If the gas turbine 11 was idling before the fuel circuit was closed, the method includes an assessment step STP5 during which the system, e.g. the calculation means 30, uses conventional methods to determine a length of time of the idling operation Tfct of the gas turbine 11 prior to the stop order being generated. The calculation means compare this length of time Tfct with a threshold Ts. For example, the threshold Ts may be equal to the above-mentioned maximum duration Tmax.

If the calculation means detect that this length of time Tfct is greater than or equal to the threshold Ts, then automatic rotation of the rotary members 14, 15 is inhibited. The gas generator, or indeed the power turbine, slows down progressively, e.g. being braked by a brake.

In contrast, if the length of time Tfct is less than the threshold Ts, then the forced ventilation step STP4 is performed.

Nevertheless, the limited duration during which the electrical machine is used in this forced ventilation step may vary as a function of the length of time Tfct. For example, this limited duration may then be equal to the difference between the stored threshold and said length of time Tfct.

In one implementation, when a stop order ORD1 is generated, the electrical machine is used in motor mode during a forced ventilation step for a limited duration equal to the difference between the stored threshold and a length of idling operation time Tfct. In the event of no prior stage of idling, the length of time Tfct is considered as being zero, thereby enabling the electrical machine to be used, either in the event of a direct stop or else following a short idling stage.

Figure 4:
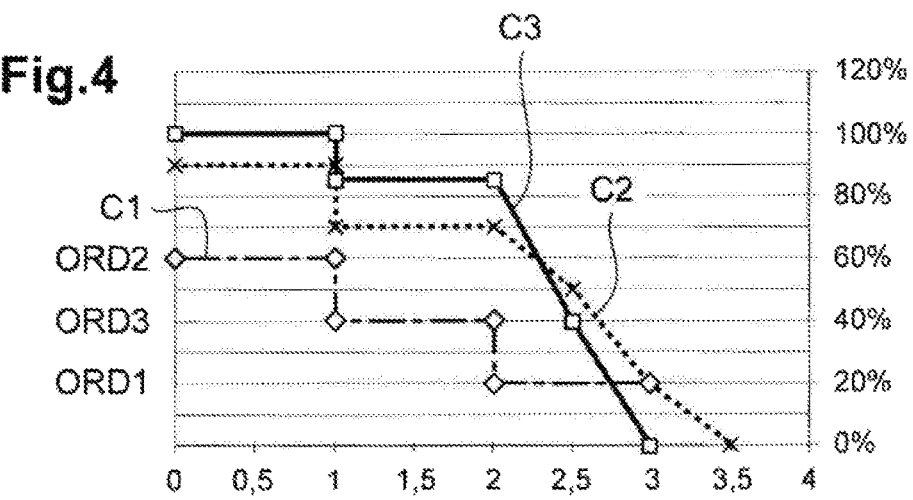
FIG. 4 is a graph showing a prior art method.
Figure 5:
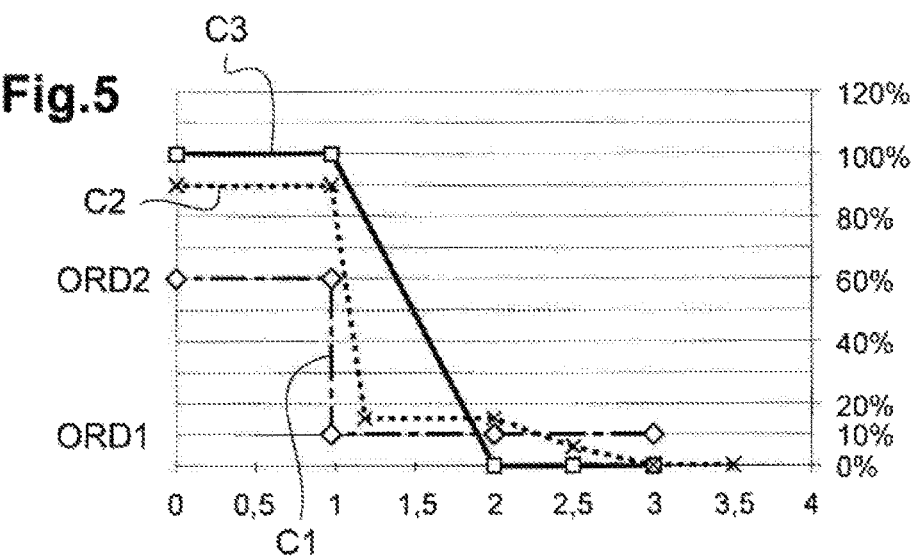
FIG. 5 is a graph showing the method of the invention.
Figure 6:
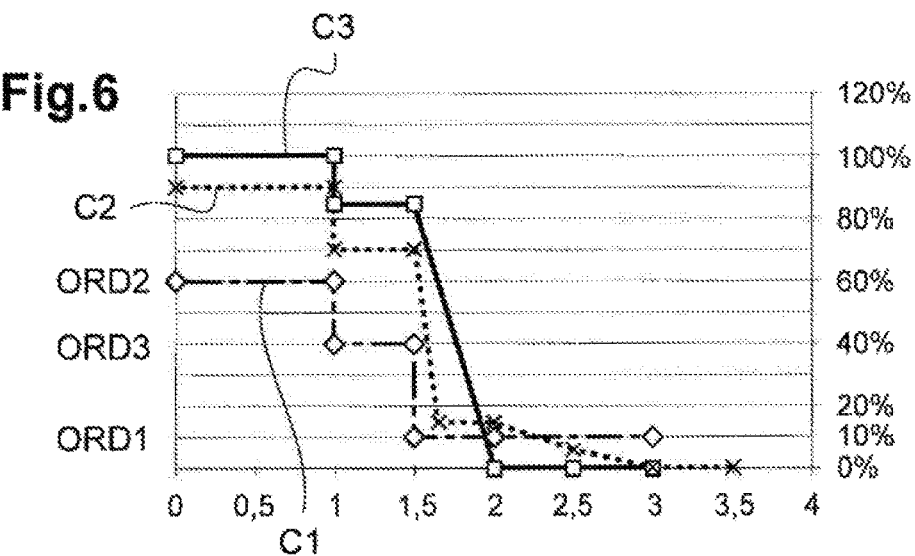
FIG. 6 is a graph showing the method of the invention.

FIGS. 4 and 6 show three respective graphs illustrating the operation of the invention compared with a prior art method. In particular, FIG. 4 shows a prior art method, FIG. 5 shows the method of the invention when no idling stage was initiated prior to causing the gas turbine to stop, and FIG. 6 shows the method of the invention when a stage of idling was initiated prior to causing the gas turbine to stop.

Each graph has an abscissa axis graduated in minutes, and both left and right ordinate axes respectively showing the position of the selector, and speeds of rotation as percentages of nominal speeds of the gas generator and of the power turbine. Each graph presents a first curve C1 showing the order given by the selector, a second curve C2 showing the speed of rotation of the gas generator, and a third curve C3 showing the speed of rotation of the power turbine, which in these examples is a power turbine that is free or that is linked via a freewheel. The time data provided is given by way of illustration and depends on the gas turbine under consideration.

In the known method of the prior art, as shown in FIG. 4, the selector initially generates a nominal operation order ORD2. The gas turbine operates in nominal manner. The speed of rotation of the power turbine is at its nominal speed and the speed of rotation of the gas generator is equal to 90% of its nominal speed.

Between one minute and two minutes, the selector generates an idling operation order ORD3. The gas turbine operates at idling speed. The speed of rotation of the power turbine is substantially equal to 85% of its nominal speed, and the speed of rotation of the gas generator is equal to 70% of its nominal speed.

At the end of two minutes needed for cooling the gas turbine, possibly as specified in a flight manual, the selector is operated to generate a stop order ORD1. The speeds of rotation of the power turbine and of the gas generator decrease down to a zero value as a function of resistive powers that are associated with losses that are mainly mechanical and aerodynamic.

In the method of the invention as shown in FIG. 5, the selector initially generates a nominal operation order ORD2. The gas turbine operates in nominal manner. The speed of rotation of the power turbine is at its nominal speed and the speed of rotation of the gas generator is equal to 90% of its nominal speed.

At the end of one minute, the selector is operated in this example to generate a stop order ORD1 directly.

The supply of fuel is cut off, and the speed of rotation of the power turbine decreases down to a zero value as a function of the resistive powers associated with losses that are mainly mechanical and aerodynamic. The deceleration of the power turbine may be optimized by performing a step of automatically braking the power turbine. The slope down which the speed of rotation of the power turbine decreases is then much steeper.

In contrast, the electrical machine is put into operation to rotate the rotary members of the gas generator. The speed of rotation of the gas generator decreases, but it is maintained at a ventilation speed, e.g. for a limited duration of one minute. By way of example, this ventilation speed may lie in the range 8% (included) to 15% (included) of the nominal speed of the gas generator, and it may optionally be a function of the outside temperature. During this step, the speed of rotation of the gas generator may be constant, or decreasing, or constant and then decreasing, for example. At the end of this limited duration, the electrical machine is switched off.

By way of example, the electrical machine may be controlled by means of a speed setpoint transmitted by the calculation means of the gas turbine to the electrical machine, the electrical machine and/or the gas generator optionally being provided with a speed or position sensor in order to enable speed to be servo-controlled, possibly internally within the electrical machine. In an example, the speed setpoint may be determined as a function of a percentage of a constant, which percentage may optionally vary as a function of outside temperature, with the constant possibly being the above-mentioned nominal speed.

The electrical machine may equally well be controlled by its own controller as a function of commands sent by the selector and as a function of its own relationships previously stored in the controller. For example, a controller of electrical machine may establish the above-mentioned speed setpoint.

Other methods of control may be envisaged, and for example servo-control by means of a torque setpoint and possibly measuring electric currents by means of current sensors, thereby giving an image of the torque being developed.

In the method of the invention as shown in FIG. 6, the selector is initially operated to generate a nominal operation order ORD2. The gas turbine operates in nominal manner. The speed of rotation of the power turbine is at its nominal speed and the speed of rotation of the gas generator is equal to 90% of its nominal speed.

At the end of one minute, the selector is operated to generate an idling operation order ORD3. The gas turbine operates at an idling speed for a length of time Tfct. If this length of time is longer than the stored threshold, the fuel circuit is cut off at the end of this length of time without the electrical machine being operated.

In the example shown, the threshold is set at one minute, and the time is equal to thirty seconds.

Under such circumstances and in this example, after one minute and thirty seconds, the selector is operated to generate a stop order ORD1. The supply of fuel is cut off, and the speed of rotation of the power turbine decreases down to a zero value as a function of the resistive powers associated with losses that are mainly mechanical and aerodynamic. In contrast, the electrical machine is put into operation to rotate the rotary members of the gas generator. The speed of rotation of the gas generator decreases, but, by way of example, it is maintained for a limited duration at a speed lying in the range 8% to 15% of its nominal speed. At the end of this limited duration, the electrical machine is switched off. In this example, the limited duration is equal to the difference between the threshold of one minute and the length of time Tfct of thirty seconds, and is therefore equal to thirty seconds.

In another aspect, if following generation of the stop order, the selector is operated to generate an order for nominal or idling operation, the gas turbine is re-started. The above described method can then be applied once again.

Naturally, the present invention may be subjected to numerous variations as to its implementation. Although several embodiments are described, it should readily be understood that it is not conceivable to identify exhaustively all possible embodiments. It is naturally possible to envisage replacing any of the means described by equivalent means without going beyond the ambit of the present invention.

What is claimed is:

1. A method of stopping at least one gas turbine, the at least one gas turbine comprising a gas generator provided with rotary members and a combustion chamber, the at least one gas turbine comprising at least one power turbine, the at least one gas turbine comprising a fuel circuit controlled by calculation means, the calculation means being in communication with a selector;
    wherein the method comprises the following steps for stopping the at least one gas turbine while it is in operation and being fed with fuel by the fuel circuit:
    generating a stop order with the selector for stopping the at least one gas turbine;
    following the generation of the stop order, closing the fuel circuit on order of the calculation means; and
    following the generation of the stop order, and if the at least one gas turbine was not idling prior to the stop order, or if the at least one gas turbine was in idling operation at the time of the generation of the stop order for a length of time shorter than a stored threshold, automatically making use of an electrical machine to rotate the rotary members for a limited duration.

2. The method according to claim 1, wherein the method includes a step of braking the at least one power turbine with a brake.

3. The method according to claim 1, wherein the limited duration is equal to a stored maximum duration.

4. The method according to claim 1, wherein the selector is configured to be capable of generating an idling operation order for the at least one gas turbine, and the method includes the following steps:
    detecting that the at least one gas turbine is idling at the moment the stop order is generated;
    when the at least one gas turbine was idling at the moment the stop order was generated, determining the length of time in idling of the at least one gas turbine before the stop order was generated; and
    when the length of time is shorter than the threshold, automatically making use of the electrical machine to rotate the rotary members for the limited duration.

5. The method according to claim 4, wherein the limited duration varies as a function of the length of time.

6. The method according to claim 4, wherein the limited duration is equal to the difference between the stored threshold and the length of time.

7. The method according to claim 1, wherein while the rotary members are being rotated by the electrical machine for the limited duration, the electrical machine drives the rotary members in rotation at a ventilation speed that can be set automatically in use.

8. The method according to claim 1, wherein the selector is configured to be capable of generating an order for the gas generator to operate at an idling speed while the rotary members are being rotated by the electrical machine for the limited duration, the electrical machine drives rotation of the rotary members at a ventilation speed less than the idling speed.

9. The method according to claim 7, wherein the ventilation speed lies at most in the range 8% to 15% of a stored nominal speed for the gas generator.

10. The method according to claim 7, wherein the ventilation speed is either constant or else decreasing or else is constant and then decreasing.

11. The method according to claim 1, wherein the electrical machine automatically rotates the rotary members for a limited duration under the control either of a signal transmitted by the selector to the electrical machine, or of a signal transmitted by the calculation means to the electrical machine, or of a signal transmitted by an external controller that is in communication at least with the selector or with the calculation means.

12. The method according to claim 1, wherein the step of automatically making use of an electrical machine to rotate the rotary members for a limited duration comprises a step of controlling the speed of the electrical machine as a function of a speed that is estimated using at least one sensor of the electrical machine or of the at least one gas turbine.

13. The method according to claim 1, wherein the step of automatically making use of an electrical machine to rotate the rotary members for a limited duration comprises a step of controlling the torque of the electrical machine as a function of a torque estimated from a measurement of the electric current consumed by the electrical machine.

14. The method according to claim 1, wherein the at least one gas turbine comprises a plurality of gas turbines, each connected to a respective electrical machine, and the method includes the following step: controlling each electrical machine in motor mode with a common controller, the controller activating the electrical machines one after another while stopping the gas turbines, with none of the electrical machines being capable of operating in an electricity generator mode during the stopping.

15. A system provided with at least one gas turbine, the gas turbine comprising a gas generator provided with rotary members and with a combustion chamber, the gas turbine comprising at least one power turbine, the gas turbine comprising a fuel circuit controlled by calculation means, the calculation means being in communication with a selector, the selector being configured to generate a stop order for stopping the at least one gas turbine and for generating at least one operation order for operating the at least one gas turbine;
    wherein the system includes a respective electrical machine for each gas turbine, the electrical machine being connected to the gas generator of the corresponding gas turbine and being configured to apply the method according to claim 1.

16. The system according to claim 15, wherein the system includes at least one brake for braking the power turbine.

17. A vehicle wherein the vehicle includes the system according to claim 15.

18. The vehicle according to claim 17, wherein the vehicle includes at least one rotor that is rotated by the power turbine.

19. A method of stopping a gas turbine, the gas turbine comprising a gas generator provided with rotary members and a combustion chamber, the gas turbine comprising a power turbine, the gas turbine comprising a fuel circuit controlled by a controller, the controller in communication with a selector;
- wherein the method comprises the following steps for stopping the gas turbine while it is in operation and being fed with fuel by the fuel circuit:
- generating a stop order with the selector for stopping the gas turbine;
- following the generation of the stop order, closing the fuel circuit on order of the controller; and
- following the generation of the stop order, and if the gas turbine was not idling prior to the stop order, or if the gas turbine was in idling operation at the time of the generation of the stop order for a length of time shorter than a stored threshold, automatically making an electrical machine to rotate the rotary members for a limited duration.

20. The method according to claim 19, wherein the method includes a step of braking the power turbine with a brake.

\* \* \* \* \*